3,065,090
METHOD OF PREPARING GLASS
Robert W. Hopkins, Hamilton, Ohio, assignor, by mesne assignments, to Pittsburgh Plate Glass Company
Filed May 11, 1959, Ser. No. 812,459
6 Claims. (Cl. 106—52)

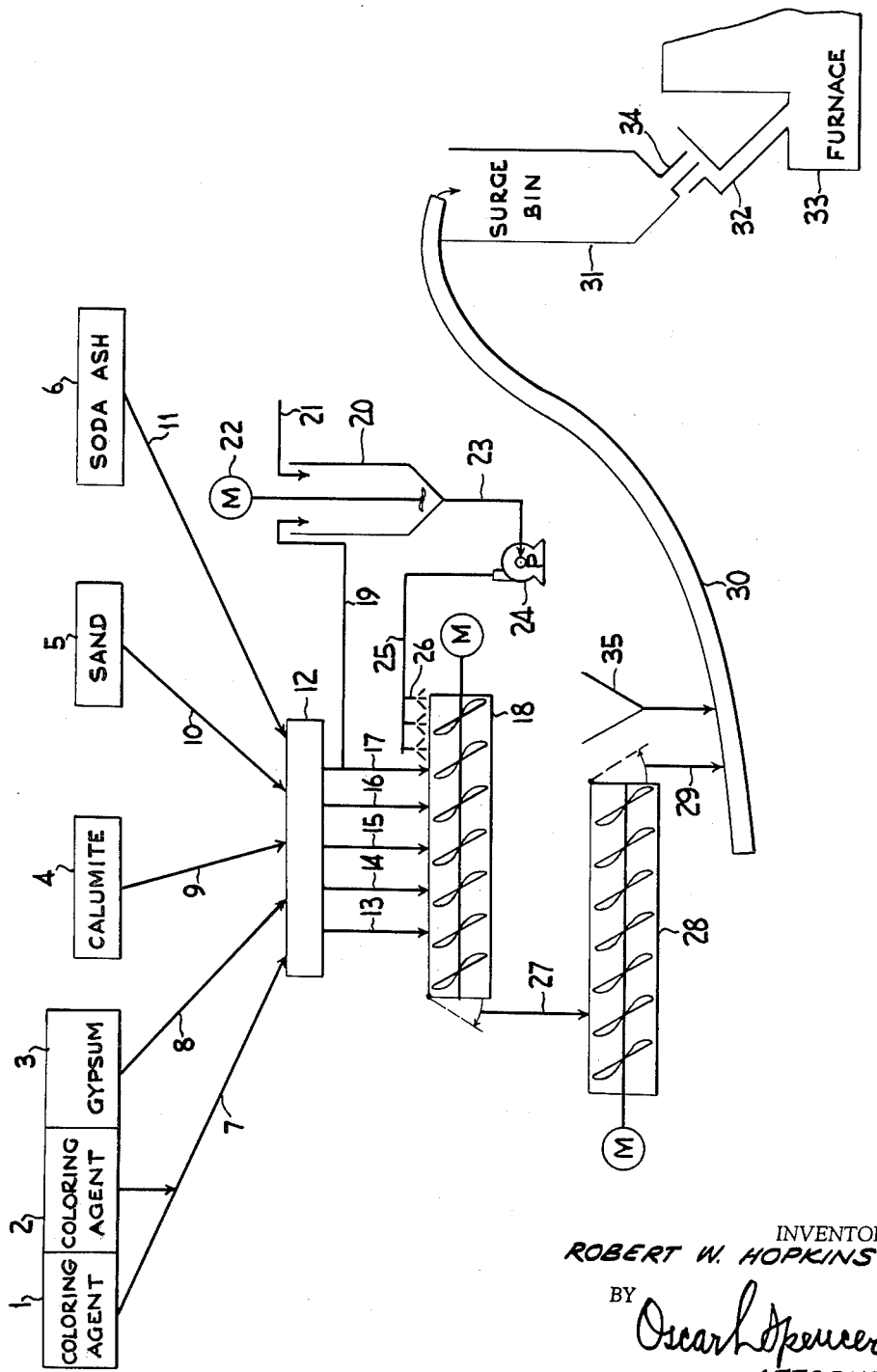

The present invention relates to the manufacture of glass. More particularly, the invention relates to improvements in the preparation of mixing and handling batches of glass making ingredients for feeding to glass forming furnaces.

In the manufacture of glass, many problems are encountered during the mixing and melting operations that seriously interfere with the efficiency and economy of the overall glass making operation. Thus, considerable carryover of dust from melting furnaces is one particularly bothersome problem encountered which often requires the employment of extensive dust trapping and collection equipment on furnace flues. Another associated problem concerns the occurrence of considerable internal dusting in the melting furnaces employed. Internal furnace dust contains alkali ingredients of the glass batches employed which cause considerable damage within the furnace to refractory linings, necessitating costly and frequent shut-downs for replacement or repair of refractory linings on furnace upper sides and tops. Still further, considerable quantities of glass often are rejected because of the existence therein of blisters caused by trapped gases in the melted batches. Quite frequently, seeds or unmelted sand particles in the glass product occur which also necessitates the rejection of product. In addition, considerable dusting during the mixing and handling operations occurs, rendering these operations difficult and the batches fed to the glass furnaces non-uniform. Still further non-uniformity of batch ingredients is often encountered due to localized accumulation of specific ingredients in mixed batches.

It has been found in accordance with this invention, that many of the problems hereinabove referred to may be eliminated or minimized to a great extent and that other advantageous operational conditions may be obtained. Thus, dusting in the mixing and conveying operations as well as in the furnace melting operation and carry-over problems are substantially eliminated. The frequency of the production of inferior glass containing blisters and seeds is substantially reduced. The melting time for any specific batch of glass making ingredients in a furnace is substantially reduced, thereby providing increased furnace capacity. Refractory linings of glass melting furnaces are maintained in operational condition for considerably longer periods of time when glass batches prepared in accordance with this process are employed. In addition, uniformity of batches fed to glass forming furnaces is easily accomplished and maintained.

Thus, it has been found according to this invention that in preparing batches of glass making ingredients containing sand and alkali, that the above enumerated advantages may be obtained by adding the alkali requirement of the glass batch ingredients to the sand as an alkali solution to thereby provide a moist mixture of batch making ingredients having free flowing characteristics. Preferably, addition of alkali to the glass batch ingredients is so conducted that a portion of it is added as an aqueous alkaline solution. Though it is not intended or desired that the invention be limited by any particular theory with respect to the accomplishment of the superior properties obtainable by the batches prepared in this manner, it is believed that the addition of a portion of the alkali requirement of a given batch to the sand as an aqueous solution produces an alkali coating on the sand particles present in the batch. This alkali coating or encasement of the sand content of the batch ingredients provides more intimate contact and a greater heat transfer efficiency between the alkali and the sand present to assist in melting operations. The intimate contact of sand particles and alkali solution results in the formation of agglomerates which are less susceptible to dusting than individual sand or alkali particles.

The aqueous solutions of alkali added to glass making ingredients are prepared in conventional digesting equipment. The amount of alkali added to the batch in aqueous form will determine the quantity or water and temperatures employed in solubilizing the alkali. While this quantity of aqueous alkali solution added to a particular batch may be subject to considerable variation, it is found advantageous to employ quantities in a range of between 5 and 40 percent basis the total weight content of the alkali in the batch, preferably between 10 and 25 percent by weight. Quantities of alkali below 5 percent added in solution form, while beneficial in achieving some advantages, are not as effective as additions conducted above this value or in the preferred range. The alkali solutions employed are saturated with respect to alkali and range generally from between 5 to about 45 percent alkali by weight of the solution in alkali concentration, depending on the temperature of the solvent and the particular alkali employed. The alkali constituent of the glass batch may be an alkali metal salt such as sodium carbonate, sodium sulfate, sodium bicarbonate, potassium carbonate and other like alkali metal salts and mixtures thereof. Soda ash forms the preferred form of alkali metal employed. The water content of the batches prepared in accordance with this invention may range between about 2 and about 20 percent by weight of water content of the batch. When soda ash is employed as the batch alkali, enough water is added to form sodium carbonate monohydrate, preferably more than enough water is present to form the monohydrate but not enough water is introduced in the alkali solution to produce a slurry.

The alkali liquor addition to the batch ingredients may be accomplished in various ways. In one preferred mode of operation, for example, the alkali solution is added to the sand content of the batch and mixed therewith. After the mixing has been completed, the remainder of the alkali content is added in dry form and thoroughly mixed. The remainder of the batch ingredients is then added and mixed with the alkali-sand mixture, and the batch is then ready for removal to a furnace or storage bin. While the alkali solution is preferably added to the sand prior to the addition of the remaining batch ingredients, the alkali solution addition may be conducted in other sequences if desired. Thus, for example, the sand content of a batch may be mixed in a dry condition with a portion of the alkali required in the batch. After thorough mixing of the dry sand and dry alkali, an alkali solution representing the balance of the alkali requirement of the finished batch may be added. Similarly, the sand content of a batch may be mixed with all other glass making ingredients for a particular batch along with a portion of the alkali content of the batch, and after thorough mixing, a subsequent addition of the remaining alkali requirement of the finished batch may be added as an aqueous solution.

The time required for mixing batch ingredients in accordance with the instant invention is, of course, subject to considerable variation depending upon the nature of the batch itself, the quantity of alkali added as an aqueous solution and other similar considerations. In general, the dry ingredients to which the aqueous alkali solution is added, are mixed thoroughly in mechanical devices such as pug mills, rotary mixers, tumblers, mix mullers and other like mechanical mixing devices. The important consideration in the mixing operation is the obtention of the maximum dispersion of particles uniformly throughout the batch.

Operation of the process of this invention may be more readily understood from consideration of the accompanying drawing, which illustrates diagrammatically one method which may be utilized in accomplishing the objects of the invention. As seen in the drawing, the components of the batch ingredients are stored in bins 1, 2, 3, 4, 5 and 6. Though, as shown in the drawing, 6 bins are employed, more or less bins may be utilized as the requirements of the particular glass batch dictate. Appropriate feed lines 7, 8, 9, 10 and 11 are shown leading from the bins to weighing scale 12. From the weigh scale, feed lines 13, 14, 15, 16 and 17 are utilized to transfer material to pug mill 18. Below the weigh scale 12 on the feed line 17 is a by-pass line 19 utilized to transfer material from the scale to a digester 20. Associated with digester 20 is a stirring device 22 and a water inlet line 21. A discharge line 23 located in the bottom of the digester 20 is associated with a pump 24 and feed line 25, equipped with suitable distribution means at the end thereof such as spray device 26. Located between pug mill 18 and a second pug mill 28 is a feed line 27 for discharging material from the pug mill 18 into the pug mill 28. Discharge 29, shown at the exit of the pug mill 28, is utilized to discharge material from the mill to a belt conveyor 30. Belt conveyor 30 discharges into a storage bin 31 from which material is then transferred via a discharge line 34 to a vibrating feeder 32 which terminates in the furnace 33. Located between the end of the belt conveyor and the storage bin is a cullet hopper 35.

In operation of the process in accordance with this invention, alkali is discharged from the bin 6 through line 11 to the weigh scale 12 in a quantity representing approximately 20 percent of the total alkali requirement of the finished batch. After the material has been carefully weighed, it is discharged through line 19 into digester 20. Sufficient water is added to adequately digest the alkali content of the digester. Suitable agitation is provided by actuating the stirring device 22. The sand requirement for the glass batch is then introduced through line 10 to the weigh scale 12 and discharged from the scale through line 16 to the pug mill 18. After the sand has entered the pug mill, the contents of the digester 20 are discharged through line 22, pump 24, line 24 and sprayed on the sand particles. Pug mill 18 is actuated to provide adequate mixing of the alkali solution and sand particles contained therein. After suitable mixing has been accomplished, the remainder of the soda ash requirement for the batch is added to the scale and discharged via line 17 to the pug mill. The other ingredients contained in bins 1, 2, 3 and 4 are added similarly in required quantities and discharged through lines 13, 14 and 15 respectively to the pug mill 18. The materials are mixed in the pug mill for a sufficient period of time to produce a substantially uniform batch and are discharged through line 27 to pug mill 28 where further mixing is conducted. Upon completion of the mixing operation, the glass batch ingredients are then discharged through line 29 to the belt conveyor 30 from which they are transported to a storage bin 31. From storage bin 31 the ingredients are passed through line 34 to a vibrator feeder 32 and fed to the furnace 33 as required. If desired, material from the cullet hopper may be added to the batch ingredients on the belt conveyor.

Glass making ingredients mixed in the above described manner are found to be extremely desirable in glass melting characteristics, exhibiting fast melting times with little or no dusting occurring. The batches themselves are wet and free flowing.

Advantages obtainable by utilizing the addition of a portion of the alkali requirement of glass batch as an aqueous solution may be readily seen from the following examples.

*Example I*

A glass batch is prepared from the following ingredients in the amounts indicated.

| | Grams |
|---|---|
| Sand | 750 |
| Soda ash | 300 |
| Calumite | 225 |
| Gypsum | 32 |
| Iron chromite | 4.25 |

The above ingredients are placed in a glass jar, the jar is then covered and tumbled by hand for several minutes to insure thorough mixing of the ingredients. A 20-gram sample from the jar is weighed out and placed in a ceramic crucible. The crucible is placed in an electric muffle furnace having an internal temperature of 2600° F. for a period of 5 minutes. The crucible is then removed and after cooling at ambient temperature (70° F.) to a temperature suitable for handling, the crucible is cracked and the glass is visually examined. The results are as follows:

(1) Total glass depth is three-eighths of an inch. Three-sixteenths of an inch of amber (reduced) glass is present in this glass depth. (Measurements made by ruler.)
(2) Three-sixteenths of an inch of the three-eighths of an inch of glass is composed of unmelted batch. (Measurements made by ruler.)

*Example II*

A glass batch is prepared from the following ingredients:

| | Grams |
|---|---|
| Sand | 750 |
| Soda ash | 300 |
| Calumite | 225 |
| Gypsum | 32 |
| Iron chromite | 4.25 |

Sixty (60) grams of the soda ash are dissolved in 111 grams of water at a temperature of 100° F. to provide a 35 percent (by weight) soda ash solution. The 700 grams of sand are placed in a glass jar and the entire 35 percent soda ash solution is added to the jar, the jar covered and the contents thoroughly mixed by tumbling. After thorough mixing the iron chromite, the remaining soda ash and the calumite are placed in the glass jar, the jar is covered and the contents thoroughly mixed by tumbling once more. The gypsum is then added to the soda ash mixture in the jar, the jar once again covered and tumbled until all of the ingredients are thoroughly mixed. The water content of the mix is 7.8 percent by weight. In order to compensate for water content of the batch added in the alkali solution, a 21.6-gram sample taken from the tumbler is weighed out and placed in a ceramic crucible. The crucible is placed in an electric muffle furnace operating with an internal temperature of 2600° F. for a period of 5 minutes. The crucible is then removed from the furnace, cooled at ambient temperature (70° F.) until the crucible is cool enough to handle. The crucible is then cracked and the glass contents examined. The results are as follows:

(1) No amber glass is observed in the glass sample.
(2) One-thirty-second of an inch of unmelted batch is present in the glass depth of three-eighths of an inch. (Measurements made by ruler.)
(3) Microscopic examination of the particles in the batch before melting shows the sand encased with alkali crystals. (The crystals are a sodium carbonate hydrate.)

Example III

A soda-lime glass batch was prepared from the following ingredients in the indicated amounts.

| | Grams |
|---|---|
| Sand | 200 |
| Limestone | 50 |
| Soda ash | 70 |

The above ingredients were placed in a glass jar and hand tumbled until thoroughly mixed. A 20-gram sample taken from the mixed batch was weighed into a ceramic crucible. The crucible was placed in an electric muffle furnace having an internal temperature of 2600° F. for a period of 10 minutes. The crucible was then removed from the furnace, cooled at ambient temperature (70° F.) until cool enough to handle. The crucible was then broken and the contents examined.

(1) The glass sample had a depth of three-eighths of an inch, with three-sixteenths of an inch of the sample composed of unmelted batch.

Example IV

A soda-lime glass batch was prepared from the following ingredients:

| | Grams |
|---|---|
| Sand | 200 |
| Limestone | 50 |
| Sode ash | 70 |

Fourteen grams of the soda ash were dissolved in 36 grams of water which had a temperature of 100° F. to produce a 35 percent (by weight) soda ash solution. The 200 grams of sand were placed in a glass jar and the entire 35 percent soda ash solution was added, the jar was covered and the contents thoroughly mixed with the sand by hand tumbling the jar. The remaining dry soda ash (56 grams) and limestone (50 grams) were then added to the jar, the jar was again covered and the contents were again tumbled until a thorough mixing of the ingredients was obtained. The water content of the mixture was 10 percent by weight. A 22-gram sample was weighed into a crucible from the prepared mixture and placed in an electric muffle furnace operated at 2600° F. for a period of 10 minutes. The crucible was cooled to room temperature (70° F.) until cool enough to handle. The crucible was then cracked and the glass content examined.

(1) The glass content had a depth of three-eighths of an inch with a one-thirty-second of an inch of unmelted batch being present.

As can be readily observed from the above examples, a considerable advantage in the rate of melting is obtained when a portion of the alkali content of the batch is added in liquor form. The addition of alkali to the batch in a dry state does not produce batches which melt at the fast rate of the alkali liquor formed batches.

While the invention has been described with reference to certain specific examples, it is not intended that the invention be limited except insofar as appears in the accompanying claims.

I claim:

1. A method of preparing glass by mixing and heating a mixture of glass making ingredients comprising sand and alkali metal salts, which comprises forming an aqueous solution of a portion of said salts, mixing said aqueous solution of said salts with said sand and the remainder of said alkali metal salts, the amount of aqueous solution present being enough to produce a wet mixture of the alkali metal salts and sand and thereby forming agglomerates, feeding the resulting agglomerates into a glass forming furnace and melting said agglomerates.

2. A method of preparing glass by mixing and heating a mixture of glass making ingredients comprising sand and an alkali metal carbonate, which comprises forming an aqueous solution of at least a portion of said alkali metal carbonate, adding said aqueous solution of alkali metal carbonate to said sand and the remainder of said alkali metal carbonate, the amount of aqueous solution present being sufficient to produce a wet mixture and thereby forming agglomerates, feeding the resulting agglomerates into a glass forming furnace and melting said agglomerates.

3. A method of preparing glass by mixing and heating a mixture of glass making ingredients comprising sand and alkali metal salts, which comprises forming an aqueous solution of a portion of the alkali metal salt content of the ingredients, adding said solution to the sand to form a wet free-flowing mixture, mixing said wet free-flowing mixture with the remainder of the alkali metal salts, feeding the resulting free-flowing mixture so formed to a glass forming furnace and melting said mixture.

4. A method of preparing glass by mixing and heating a mixture of glass making ingredients comprising sand and an alkali metal carbonate, which comprises forming an aqueous solution of a portion of the alkali metal carbonate content of the ingredients, mixing said solution with the sand to form a wet free-flowing mixture, mixing said wet free-flowing mixture with the remainder of the alkali metal carbonate ingredients, feeding the resulting free-flowing mixture to a glass forming furnace and melting said mixture.

5. A method of preparing glass by mixing and heating a mixture of glass making ingredients comprising sand and soda ash, which comprises forming an aqueous solution of a portion of the soda ash content of the ingredients, mixing said aqueous solution with the sand to form a wet free-flowing mixture, mixing said wet free-flowing mixture with the remaining portion of the soda ash content of the ingredients, feeding the resulting free-flowing mixture to a glass forming furnace and melting said mixture.

6. A method of preparing glass by mixing and heating a mixture of glass making ingredients comprising sand and soda ash, which comprises forming an aqueous solution of at least a portion of the soda ash content of the ingredients, mixing said aqueous solution with the sand to form a wet free-flowing mixture, said aqueous solution containing between 5 and 40 percent of the soda ash content of the ingredients, mixing the remainder of the soda ash content of the ingredients with said wet free-flowing mixture, feeding the resulting free-flowing mixture while wet to a glass forming furnace and melting said mixture.

References Cited in the file of this patent

UNITED STATES PATENTS

| 2,220,750 | Bair et al. | Nov. 5, 1940 |
| 2,255,238 | Willis | Sept. 9, 1941 |
| 2,366,473 | Bair | Jan. 2, 1945 |
| 2,461,011 | Taylor et al. | Feb. 8, 1949 |
| 2,813,036 | Poole | Nov. 12, 1957 |

FOREIGN PATENTS

| 576,335 | Great Britain | Mar. 29, 1946 |